United States Patent
Inoue

(10) Patent No.: US 9,868,490 B2
(45) Date of Patent: Jan. 16, 2018

(54) ELECTRIC VEHICLE

(71) Applicant: KAWASAKI JUKOGYO KABUSHIKI KAISHA, Kobe-shi, Hyogo (JP)

(72) Inventor: Masafumi Inoue, Miki (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 176 days.

(21) Appl. No.: 14/655,199

(22) PCT Filed: Dec. 25, 2012

(86) PCT No.: PCT/JP2012/008248
§ 371 (c)(1),
(2) Date: Jun. 24, 2015

(87) PCT Pub. No.: WO2014/102851
PCT Pub. Date: Jul. 3, 2014

(65) Prior Publication Data
US 2015/0329176 A1    Nov. 19, 2015

(51) Int. Cl.
*B62D 61/02* (2006.01)
*B62M 7/04* (2006.01)
(Continued)

(52) U.S. Cl.
CPC .......... *B62M 7/04* (2013.01); *B60K 1/00* (2013.01); *B60K 1/04* (2013.01); *B60L 11/1803* (2013.01);
(Continued)

(58) Field of Classification Search
CPC .............. B62M 7/00; B62M 7/02; B62M 7/04
(Continued)

(56) References Cited

U.S. PATENT DOCUMENTS 5,406,154 A * 4/1995 Kawaguchi ............... B60L 7/10
180/220
5,610,814 A * 3/1997 Sugioka ..................... B60L 3/00
180/273
(Continued)

FOREIGN PATENT DOCUMENTS

JP    H05193367 A    8/1993
JP    H06191047 A    7/1994
(Continued)

OTHER PUBLICATIONS

State Intellectual Property Office of the People's Republic of China, Office Action and Search Report Issued in Application No. 201280077863.8, dated Nov. 28, 2016, 9 pages. (Submitted with Translation of Search Report).
(Continued)

*Primary Examiner* — Joseph M Rocca
*Assistant Examiner* — Conan D Duda
(74) *Attorney, Agent, or Firm* — Alleman Hall Creasman & Tuttle LLP

(57) ABSTRACT

An electric vehicle comprises an electric motor which generates driving power for driving a wheel; a battery case accommodating a battery storing DC power to be supplied to the electric motor, in a battery space in an interior of the battery case; and an inverter which converts the DC power supplied from the battery into AC power and supplies the AC power to the electric motor, wherein the inverter is placed above the battery to overlap with the battery case when viewed from above.

9 Claims, 10 Drawing Sheets

(51) Int. Cl.
*B60L 11/18* (2006.01)
*B62K 19/30* (2006.01)
*B60L 15/00* (2006.01)
*H01M 2/10* (2006.01)
*B60K 1/04* (2006.01)
*B60K 1/00* (2006.01)
*H01M 10/6552* (2014.01)

(52) U.S. Cl.
CPC ....... *B60L 11/1877* (2013.01); *B60L 11/1879* (2013.01); *B60L 15/007* (2013.01); *B62K 19/30* (2013.01); *H01M 2/1077* (2013.01); *B60L 2200/12* (2013.01); *B60L 2210/30* (2013.01); *B60L 2210/40* (2013.01); *B60L 2270/147* (2013.01); *B60Y 2200/12* (2013.01); *B60Y 2400/61* (2013.01); *B62K 2204/00* (2013.01); *H01M 10/6552* (2015.04); *H01M 2220/20* (2013.01); *Y02T 10/645* (2013.01); *Y02T 10/705* (2013.01); *Y02T 10/7005* (2013.01); *Y02T 10/7241* (2013.01)

(58) Field of Classification Search
USPC ........................................................ 180/220
See application file for complete search history.

(56) References Cited

U.S. PATENT DOCUMENTS

| | | | | |
|---|---|---|---|---|
| 5,931,245 A * | 8/1999 | Uetake | ...................... | B60L 3/00 180/65.8 |
| 9,327,586 B2 * | 5/2016 | Miyashiro | ................ | B60K 1/04 |
| 2004/0074255 A1 * | 4/2004 | Goto | .................. | B60H 1/00428 62/498 |
| 2004/0251858 A1 * | 12/2004 | Asao | ........................ | B60K 1/04 318/139 |
| 2006/0040161 A1 * | 2/2006 | Horii | ........................ | B62M 7/02 180/65.1 |
| 2006/0060400 A1 * | 3/2006 | Iwashita | .................. | B62M 7/12 180/65.31 |
| 2006/0158890 A1 * | 7/2006 | Freedman | ................ | B62J 6/00 362/390 |
| 2006/0251946 A1 * | 11/2006 | Makuta | ............... | H01M 8/2475 429/470 |
| 2007/0235235 A1 * | 10/2007 | Fukami | ..................... | B60K 6/40 180/65.6 |
| 2010/0083916 A1 * | 4/2010 | Shintani | .................. | F01P 7/164 123/41.1 |
| 2010/0248561 A1 * | 9/2010 | Daikoku | ................ | B63H 20/20 440/3 |
| 2010/0248562 A1 * | 9/2010 | Daikoku | ................ | B63H 20/30 440/3 |
| 2011/0072841 A1 * | 3/2011 | Arai | .................... | B60H 1/00278 62/259.2 |
| 2012/0103710 A1 * | 5/2012 | Atsuchi | .................... | B60K 1/04 180/65.31 |
| 2013/0220721 A1 * | 8/2013 | Matsuda | ................ | B62K 11/04 180/220 |
| 2013/0229072 A1 * | 9/2013 | Matsuda | ................ | B62K 11/04 310/53 |
| 2013/0233633 A1 * | 9/2013 | Matsuda | ................ | B62K 19/30 180/220 |
| 2013/0233634 A1 * | 9/2013 | Matsuda | ................ | B62K 11/06 180/220 |
| 2013/0264134 A1 * | 10/2013 | Matsuda | .................. | B60K 1/04 180/68.1 |
| 2013/0270024 A1 * | 10/2013 | Matsuda | ............. | B60L 11/1877 180/220 |
| 2013/0270026 A1 * | 10/2013 | Matsuda | .................... | B62J 1/18 180/220 |
| 2013/0270038 A1 * | 10/2013 | Nitta | ...................... | B62K 11/04 184/6 |
| 2013/0270938 A1 * | 10/2013 | Matsuda | .................. | B60K 1/00 310/54 |
| 2013/0292198 A1 * | 11/2013 | Matsuda | ................ | B62K 11/04 180/220 |
| 2013/0300236 A1 * | 11/2013 | Matsuda | ................ | H02K 7/025 310/74 |
| 2014/0015455 A1 * | 1/2014 | Yonehana | ........... | B60L 11/1861 318/139 |
| 2014/0058609 A1 * | 2/2014 | Matsuda | .................... | B62J 99/00 701/22 |
| 2014/0336858 A1 * | 11/2014 | Matsushima | .......... | B62M 11/06 701/22 |
| 2014/0345827 A1 * | 11/2014 | Matsuda | ............. | B60L 11/1892 165/41 |
| 2014/0353061 A1 * | 12/2014 | Iida | ........................ | B60K 15/07 180/220 |
| 2014/0379209 A1 * | 12/2014 | Matsuda | .................. | B60L 15/20 701/34.2 |
| 2015/0008061 A1 * | 1/2015 | Matsuda | ................ | B62K 11/04 180/220 |
| 2015/0274019 A1 * | 10/2015 | Matsuda | ................ | B62K 11/04 701/22 |
| 2015/0274020 A1 * | 10/2015 | Matsuda | .................. | B60L 7/26 701/70 |

FOREIGN PATENT DOCUMENTS

| | | |
|---|---|---|
| JP | 2003189539 A | 7/2003 |
| JP | 2010100124 A | 5/2010 |
| JP | 3159814 U | 6/2010 |
| JP | 2011234559 A | 11/2011 |
| JP | 2012096594 A | 5/2012 |
| WO | 2012043562 A1 | 4/2012 |

OTHER PUBLICATIONS

European Patent Office, Extended European Search Report Issued in Application No. 12890809.2, dated Aug. 30, 2016, Germany, 7 pages.

ISA Japanese Patent Office, International Search Report Issued in Application No. PCT/JP2012/008248, dated Apr. 2, 2013, WIPO 4 pages.

* cited by examiner

ELECTRIC VEHICLE

TECHNICAL FIELD

The present invention relates to an electric vehicle which drives a wheel with driving power generated in an electric motor.

BACKGROUND ART

In recent years, an electric vehicle which drives a wheel with driving power generated in an electric motor using electric power supplied from batteries has been developed. Patent Literature 1 discloses an electric motorcycle in which batteries are accommodated in a battery accommodating section placed below a seat, and an inverter is placed on a floor panel below the batteries.

CITATION LIST

Patent Literature

Patent Literature 1: Japanese Laid-Open Patent Application Publication No. 2011-234559

SUMMARY OF INVENTION

Technical Problem

In order to increase the cruising distance of the vehicle, it is necessary to increase the batteries in size. However, in the above configuration, the batteries are placed above electric components such as the inverter. Because of the layout of the batteries with a heavy weight, the center of gravity of a vehicle body is made higher. Since the inverter is placed at a relatively lower side, it is likely that water splashing from a road surface contacts the inverter, during driving of the electric vehicle. For this reason, the inverter is required to have improved water-proof properties, which will increase cost.

Accordingly, an object of the present invention is to reduce cost by reducing the water-proof requirements of the inverter while lowering the center of gravity of the electric vehicle.

Solution to Problem

The present invention provides an electric vehicle comprising: an electric motor which generates a driving power for driving a wheel; a battery case accommodating a battery storing DC power to be supplied to the electric motor, in a battery space in an interior of the battery case; and an inverter which converts the DC power supplied from the battery into AC power and supplies the AC power to the electric motor, wherein the inverter is placed above the battery to overlap with the battery case when viewed from above.

In accordance with this configuration, since the inverter is placed above the battery to overlap with the battery case when viewed from above, the battery with a heavy weight is placed at a lower side to lower the center of gravity of a vehicle body, and it becomes less likely that water splashing from a road surface contacts the inverter. Therefore, the inverter need not meet high water-proof requirements. In addition, since the inverter can be placed in the vicinity of the battery, an electric wire (power line) connecting the inverter to the battery can be reduced in length. As a result, it becomes possible to reduce cost by reducing the water-proof requirements of the inverter while lowering the center of gravity of the electric vehicle.

The electric vehicle may be a straddle-type vehicle.

In accordance with this configuration, since the inverter is placed above the battery to overlap with the battery case when viewed from above, in the straddle-type vehicle which is limited in the width of the vehicle body, the width of the vehicle body can be reduced.

The electric vehicle may further comprise a handle; and a seat, wherein the battery and the inverter may be placed between the handle and the seat.

In accordance with this configuration, since the center of gravity of the vehicle body is easily made close to the center of the vehicle body, even when the inverter and the battery are arranged at upper and lower sides, respectively, a driver can easily steer the electric vehicle.

The electric vehicle may further comprise an electric component provided on an electric wire connecting the inverter to the battery, and the electric component may be placed above the battery.

In accordance with this configuration, the battery and the inverter can be made closer to each other.

The electric motor may be provided at a lower side of the battery case, and an electric wire connecting the electric motor to the inverter may vertically run through an internal space of the battery case.

In accordance with this configuration, since the electric wire connecting the electric motor to the inverter vertically runs through the internal space of the battery case, the electric wire can be easily protected from an outside world and space efficiency can be increased.

The electric vehicle may further comprise a cooling medium pipe which circulates a cooling medium to the inverter, and the cooling medium pipe may run through an internal space of the battery case.

In accordance with this configuration, since the cooling medium pipe runs through the internal space of the battery case, the cooling medium pipe can be easily protected from the outside world and space efficiency can be increased.

The cooling medium pipe may run through an internal space of the battery case and circulate the cooling medium to a cooling component provided at a lower side of the battery case and to the inverter.

In accordance with this configuration, since the inverter and the cooling component are arranged at upper and lower sides, respectively with the battery interposed between the inverter and the cooling component, and the cooling medium pipe vertically runs through the internal space of the battery case, the cooling medium pipe can be easily protected from the outside world and space efficiency can be increased. The cooling component may be, for example, at least one of a motor, a radiator, a pump, an oil pan, a filter, etc.

The electric vehicle may be a motorcycle, and the electric motor and the battery case may be placed between a front wheel and a rear wheel, the battery case may include an upper battery accommodating section and a lower battery accommodating section which is shorter in a forward and rearward direction than the upper battery accommodating section is, the electric motor may be placed rearward relative to the lower battery accommodating section and below the upper battery accommodating section, and the inverter may be placed above the battery case.

In accordance with this configuration, since the electric motor is placed rearward relative to the lower battery accommodating section and below the upper battery accommodating section, the center of gravity of the vehicle body can be lowered. Even when the inverter is placed above the battery case, the vertical dimension of the electric motor, the inverter, and the battery, as a whole, is not increased, and therefore the driver's steering of the motorcycle is not affected.

Advantageous Effects of Invention

As should be appreciated from the above description, in accordance with the present invention, it becomes possible to reduce cost by reducing the water-proof requirements of the inverter, while lowering the center of gravity of the electric vehicle.

DESCRIPTION OF EMBODIMENTS

Hereinafter, the embodiment will be described with reference to the drawings.

Figure 1:
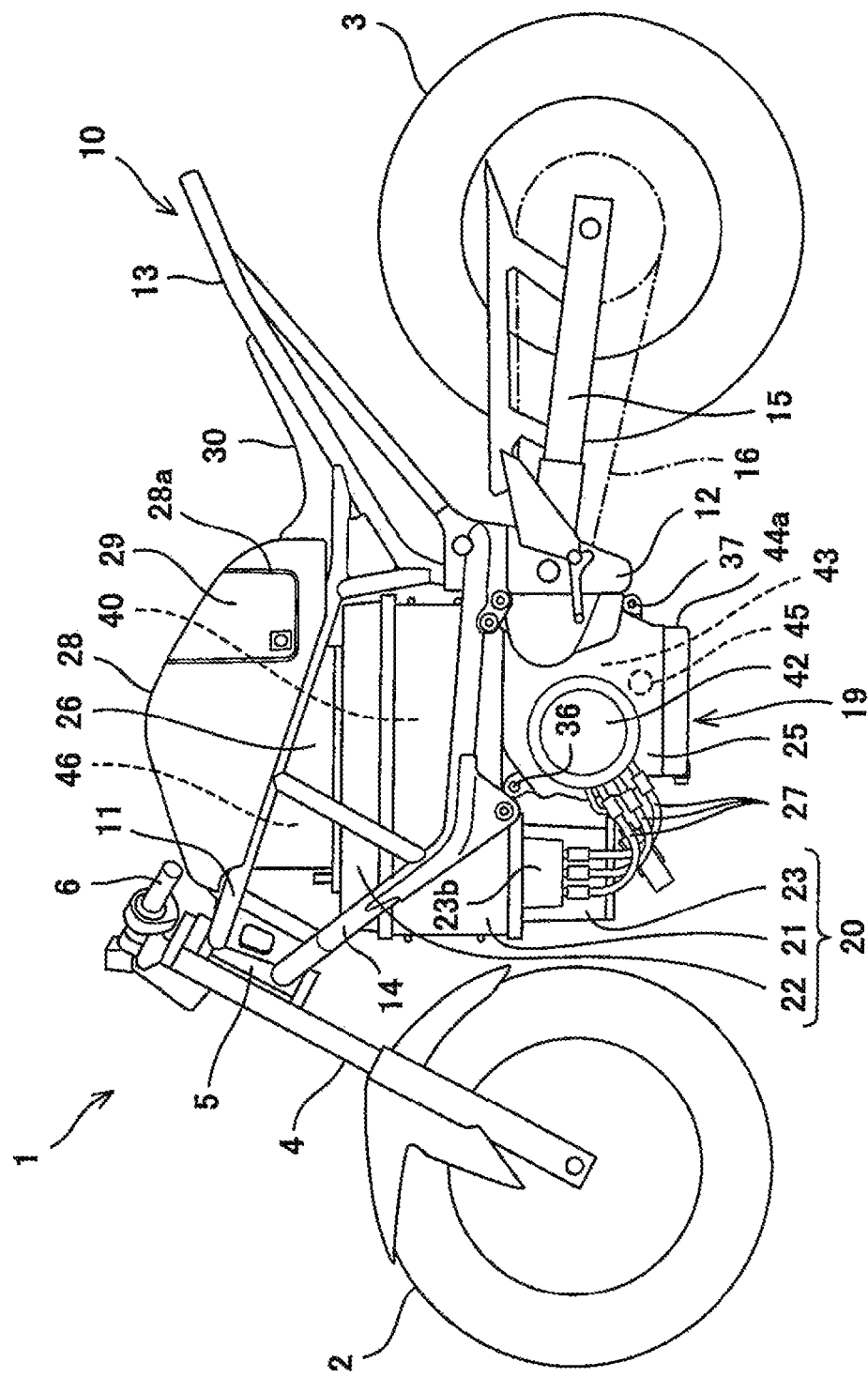
FIG. 1 is a left side view of an electric motorcycle according to an embodiment.
Figure 2:
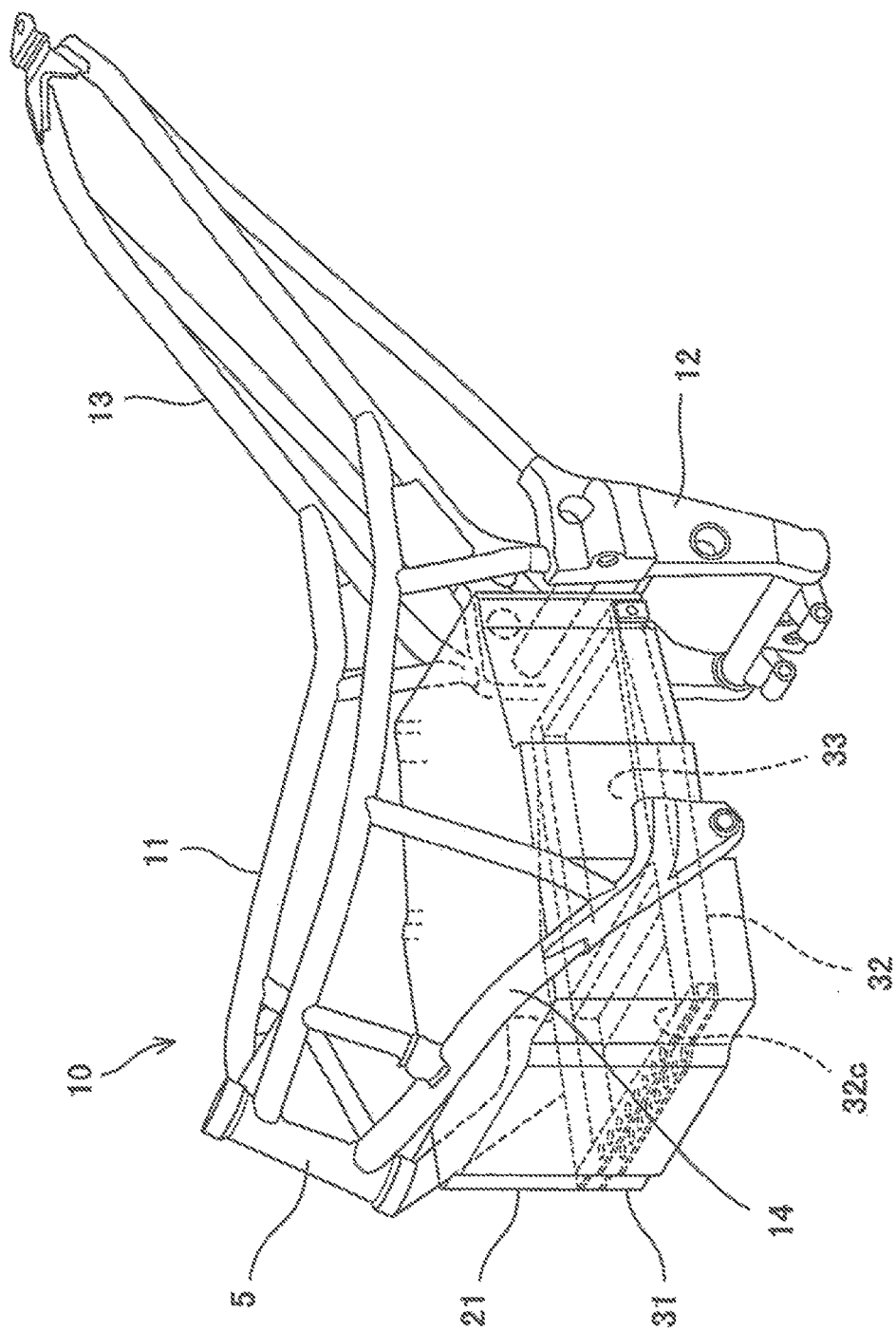
FIG. 2 is a perspective view of a vehicle body frame of the electric motorcycle of FIG. 1, when viewed from the left and front.

FIG. 1 is a left side view of an electric motorcycle 1 according to the embodiment of the present invention. FIG. 2 is a perspective view of a vehicle body frame 10 of the electric motorcycle 1 of FIG. 1, when viewed from the left and front. As shown in FIG. 1, the electric motorcycle 1 which is a straddle-type vehicle includes a front wheel 2 which is a driven wheel, and a rear wheel 3 which is a drive wheel. The front wheel 2 is rotatably mounted to the lower end portion of a front fork 4. The upper portion of the front fork 4 is integrated with a steering shaft (not shown). The steering shaft is rotatably supported by a head pipe 5 of a vehicle body in a state in which the steering shaft is inserted into the head pipe 5. A bar-type handle 6 extending in a rightward and leftward direction is attached to the steering shaft, and an accelerator grip (not shown) is provided at the right side of the handle 6.

As shown in FIGS. 1 and 2, the vehicle body frame 10 of the electric motorcycle 1 includes a pair of right and left main frames 11 extending rearward from the head pipe 5 such that they are inclined slightly downward. A pair of right and left down frames 14 are coupled to the front end portions of the main frames 11, respectively such that the down frames 14 extend downward therefrom, and then rearward. The rear end portions of the main frames 11 are connected to the upper portion of a pivot frame 12 of a frame shape. The front end portion of a swing arm 15 is mounted to the pivot frame 12 such that the swing arm 15 supports the rear wheel 3 and is vertically pivotable. A rear frame 13 is placed above the swing arm 15 and is connected to the rear end portions of the main frames 11.

The vehicle body frame 10 supports a power unit 19 in a space formed between the head pipe 5 and the pivot frame 12. The power unit 19 includes a plurality of batteries 40, an electric motor 42, an inverter 47 (see FIG. 3), and others which are integrated. The plurality of batteries 40 are accommodated into a battery case 20. The battery case 20 includes a middle case 21 which has a tubular shape in which upper and lower sides thereof are opened, and the lower end of a rear section is closed, an upper case 22 attached to the middle case 21 to close an upper opening in the middle case 21, and a lower case 23 attached to the middle case 21 to close a lower opening in the front section of the middle case 21.

The middle case 21 includes a case body 31 of a rectangular tubular shape which is made of metal, and a frame member 32 which is provided inside of the case body 31 and made of metal. The frame member 32 is placed to extend horizontally in the lower portion of the middle case 21. The batteries 40 accommodated in the middle case 21 are supported from below by the frame member 32. The frame member 32 of the middle case 21 is fastened to the down frames 14. In other words, the frame member 32 made of metal which is a portion of the battery case 20 constitutes a portion of the vehicle body frame 10.

A motor unit 25 is mounted to the battery case 20 in a location that is rearward relative to the lower case 23 and below the middle case 21. Specifically, the motor unit 25 is fastened to the frame member 32 of the middle case 21 and the pivot frame 12 by brackets 36, 37. The motor unit 25 includes a casing 44, the electric motor 42 accommodated in the casing 44 to generate a driving power for moving the vehicle body, a transmission 43 accommodated in the casing 44 to change the speed of a rotational driving power output from the electric motor 42, an oil pan 44a attached to the lower portion of the casing 44, and an oil pump 45 which suctions up and discharges oil stored in the oil pan 44a. The rotational driving power output from the transmission 43 is transmitted to the rear wheel 3 via a chain 16.

An electric component cover 26 is attached to the upper surface of the battery case 20 to form an electric component space accommodating an electric component group 46, together with the upper case 22. The electric component cover 26 is insulative, and is made of, for example, an insulating resin material. The electric component cover 26 is covered by an upper cover 28 which is a dummy tank which looks like a fuel tank of a conventional engine-driven motorcycle. The upper cover 28 is made of, for example, a metal material. The electric component cover 26 is lower in strength than the upper cover 28 is. The rear portion of the upper cover 28 is formed with a connector opening 28a through which a charging connector 75 (see FIG. 5) which will be described later, is exposed. The connector opening 28a is closed by a connector lid member 29. The rear portion of the upper cover 28, corresponding to the connector lid member 29, is smaller in dimension in a vehicle width direction than the center portion of the upper cover 28, covering the electric component cover 26. A driver seat 30 supported by the rear frame 13 is placed rearward relative to the upper cover 28. The driver seated on the seat 30 can grip the upper cover 28 with their legs. The upper surface of the battery case 20 is located below the upper end of the seat 30. In this configuration, even when the electric component group 46 including the inverter 47 and the like is placed on the battery case 20, it becomes possible to lessen the amount of the electric component group 46 which protrudes upward from a virtual line connecting the seat 30 to the head pipe 5.

The batteries 40 are placed between the head pipe 5 and the seat 30. At least a portion of the batteries 40 is placed above and forward relative to footrests of the vehicle body, and between the legs of the driver seated on the seat 30. The electric motor 42 is placed between the head pipe 5 and the seat 30. The electric motor 42 is supported on the pivot frame 12 and is configured not to be pivoted together with the swing arm 15.

Figure 3:
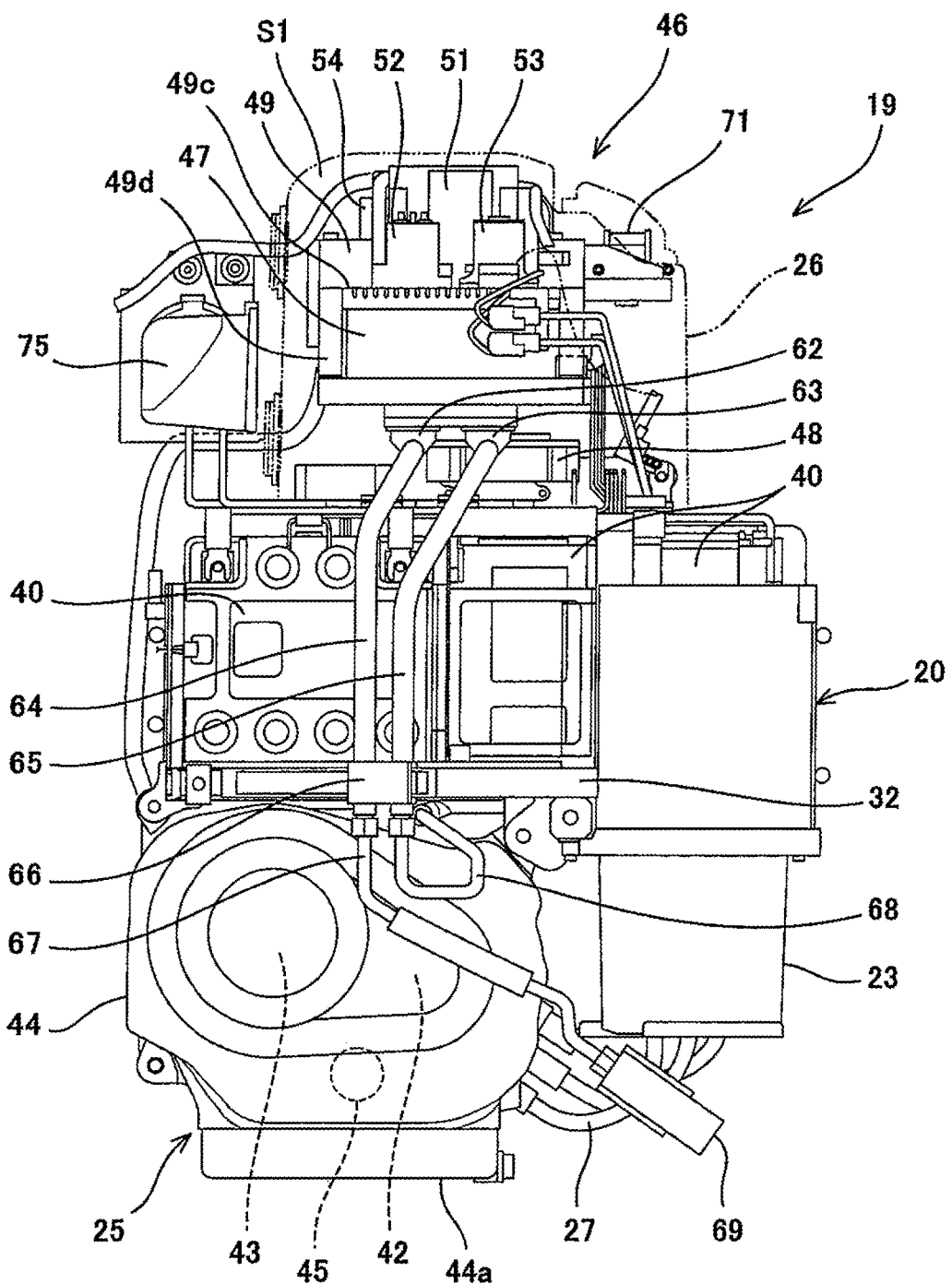
FIG. 3 is a right side view of a power unit of the electric motorcycle of FIG. 1.
Figure 4:
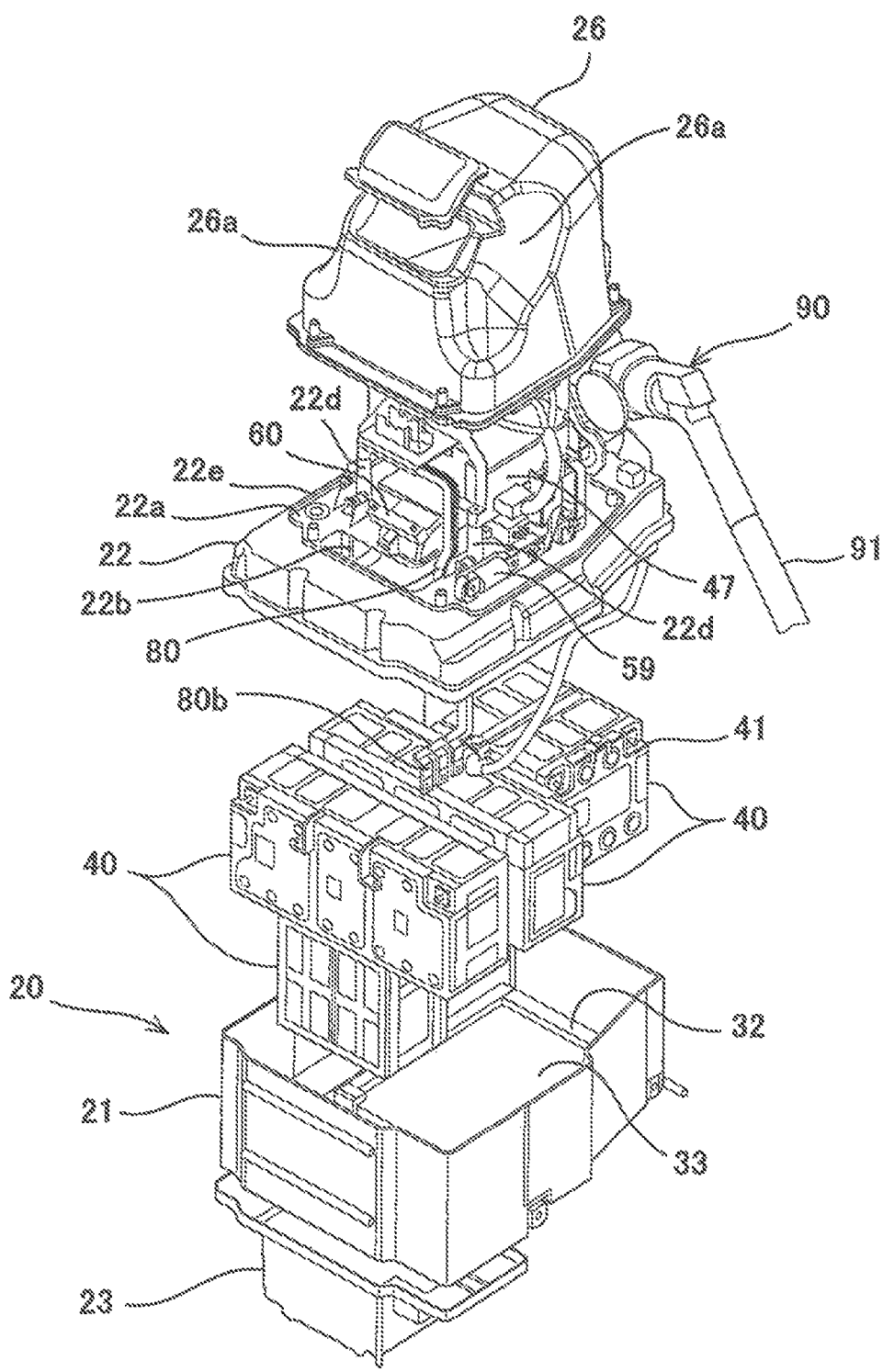
FIG. 4 is an exploded perspective view of the power unit (electric motor device is not shown) of the electric motorcycle of FIG. 1, when viewed from the left and front.
Figure 5:
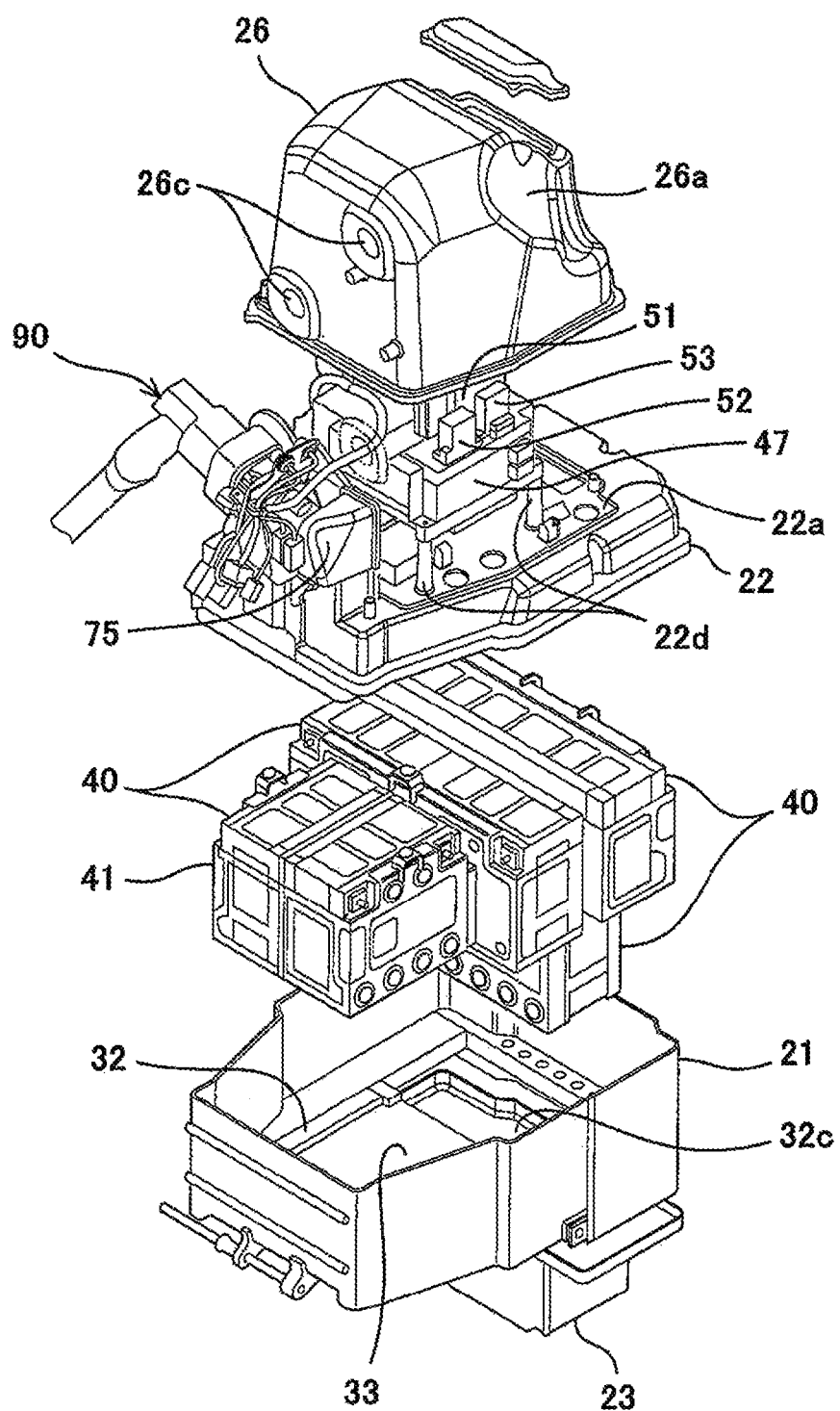
FIG. 5 is an exploded perspective view of the power unit (electric motor device is not shown) of the electric motorcycle of FIG. 1, when viewed from the right and rear.
Figure 6:
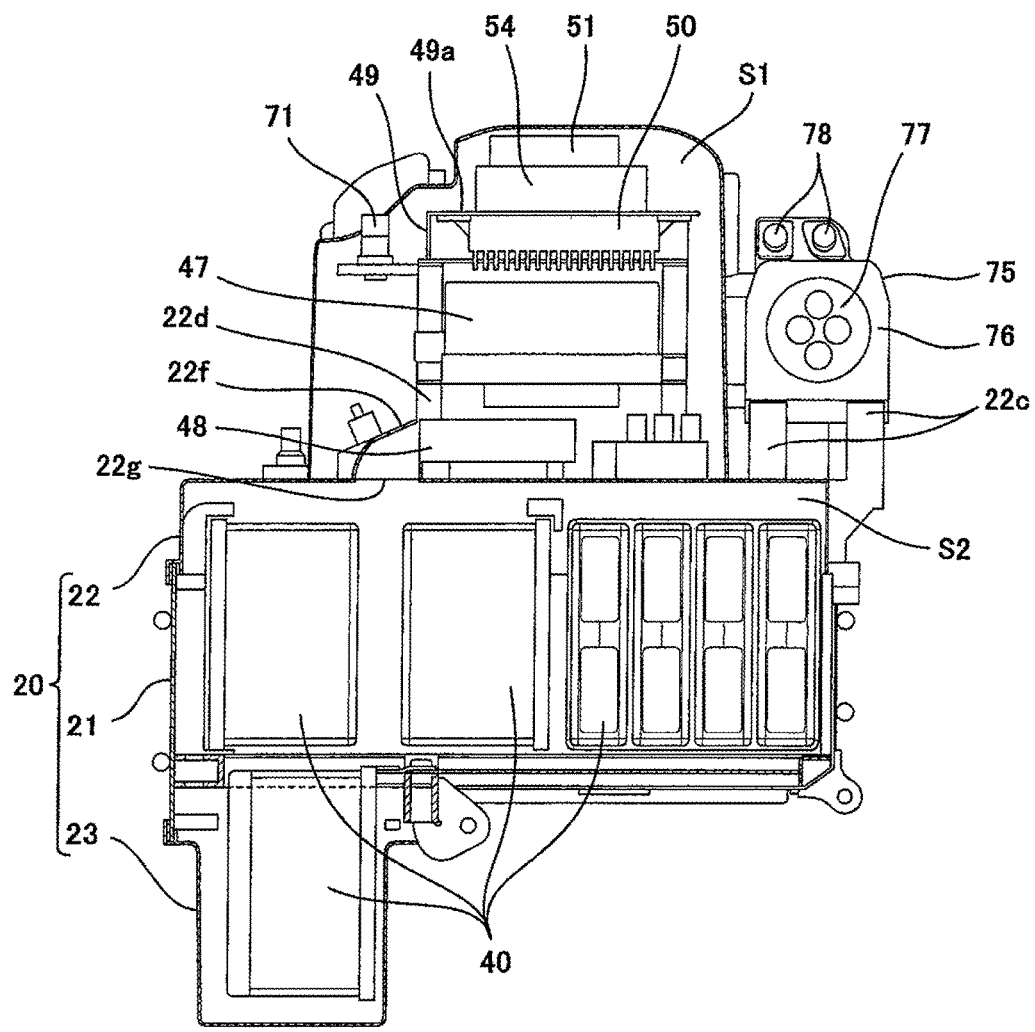
FIG. 6 is a longitudinal sectional view of the power unit (electric motor device is not shown) of the electric motorcycle of FIG. 1, when viewed from the left.

FIG. 3 is a right side view of the power unit 19 of the electric motorcycle 1 of FIG. 1. FIG. 4 is an exploded perspective view of the power unit 19 (the motor unit 25 is not shown) of the electric motorcycle 1 of FIG. 1, when viewed from the left and front. FIG. 5 is an exploded perspective view of the power unit 19 (the motor unit 25 is not shown) of the electric motorcycle 1 of FIG. 1, when viewed from the right and rear. FIG. 6 is a longitudinal sectional view of the power unit 19 (the motor unit 25 is not shown) of the electric motorcycle 1 of FIG. 1, when viewed from the left. As shown in FIGS. 3 to 6, the plurality of batteries 40 storing DC power to be supplied to the electric motor 42 are aligned in a battery space S2 in the interior of the battery case 20. The plurality of batteries 40 are integrated by a casing 41 as an assembly to form a battery group. The battery group is placed in such a manner that its front portion has a larger width than its rear portion in the vehicle width direction (rightward and leftward direction). This makes it possible to prevent an increase in the vertical dimension of the whole of the batteries 40, while increasing the capacity of the whole of the batteries 40. Correspondingly, each of the middle case 21 and the upper case 22 is configured in such a manner that its front portion has a larger width than its rear portion. This allows the driver seated on the seat 30 to easily grip the battery case 20 with their legs.

The rear region of the region of the middle case 21, which is surrounded by the frame member 32, is closed by a bottom plate 33 made of metal, which is fastened to the frame member 32 by welding, while the front region of the region of the middle case 21, which is surrounded by the frame member 32, forms an opening 32c which is in communication with the inner space of the lower case 23. In the interior of the middle case 21 and the upper case 22, the plurality of batteries 40 are accommodated such that they are placed on the frame member 32 and the bottom plate 33. The batteries 40 are also accommodated in the interior of the lower case 23. In other words, the middle case 21 and the upper case 22 constitute an upper battery accommodating section, while the lower case 23 constitutes a lower battery accommodating section. The lower case 23 as the lower battery accommodating section is shorter in length in the forward and rearward direction than the middle case 21 and the upper case 22 as the upper battery accommodating section are, and is connected to the front lower portion of the middle case 21. The motor unit 25 is placed immediately behind the lower case 23 and immediately below the middle case 21.

In other words, the electric motor 42 is placed below the battery case. In the present embodiment, more specifically, the electric motor 42 is placed below the rear portion of the battery case 20 and rearward relative to the front portion of the battery case 20. The front portion of the battery case 20 protrudes downward. The upper surface of the electric motor 42 is placed above the lowermost surface of the battery case 20. The front surface of the electric motor 42 is placed forward relative to the rearmost surface of the battery case 20. This allows the batteries 40 and the electric motor 42 to be close to each other, and the lower end of the battery case 20 to be located as low as possible. Since the terminal block of the electric motor 42 is placed below the upper surface of the batteries 40, at least a portion of an electric wire (power line) connecting the inverter 47 to the electric motor 42 runs through the interior of the battery case 20.

The upper surface of the upper case 22 of the battery case 20 is formed with an electric component region 22a surrounded by a peripheral rib 22e. The electric component cover 26 is placed over the upper surface of the upper case 22 along the peripheral rib 22e, thereby forming an electric component space S1. The electric component cover 26 is formed with a recess 26a corresponding to a recess of the upper cover 28. In the electric component space S1, the electric component group 46 is placed. In other words, the electric component group 46 is placed above the batteries 40 to overlap with the batteries 40 when viewed from above. The electric component group 46 includes electric components associated with a high-voltage current of the batteries 40, through which the high-voltage current flows. For example, the electric component group 46 includes at least one of the inverter 47 (switching device), a DC/DC converter 50 (transformer), a ground leakage sensor 51, a DC/DC converter relay 52, a varistor 53, a discharging relay 55, a charging relay 57, a fuse 59, a precharge resistor 60, and a service plug 71. In the present example, the electric component group 46 includes all of the inverter 47, the DC/DC converter 50, the ground leakage sensor 51, the DC/DC converter relay 52, the varistor 53, the discharging relay 55, the charging relay 57, the fuse 59, the precharge resistor 60, and the service plug 71. Further, the electric component group 46 may include electric components associated with a low-voltage current. In the present example, the electric component group 46 includes a fan 48 and an ECU 54 (control device).

The upper case 22 of the battery case 20 is provided with a seat section 22c protruding upward from the upper surface thereof, in a location that is rearward relative to the electric component cover 26. The charging connector 75 is mounted on the seat section 22c, to charge the batteries 40 with the electric power supplied externally. More specifically, the charging connector 75 is integrated with the battery case 20 outside of the battery case 20 to constitute a portion of the power unit 19. The charging connector 75 is placed above the batteries 40 to overlap with the batteries 40 when viewed from above. The rear wall portion of the electric component cover 26 is formed with an insertion hole 26c. The electric wire extending from the charging connector 75 is guided to the electric component space S1 through the insertion hole 26c. The charging connector 75 is provided with a connector connection surface 76 to which a power supply connector 90 of an L-shape connected to an outside power supply via a cable 91 is connected. The connector connection surface 76 faces the vehicle width direction (in the present example, leftward). The connector connection surface 76 is provided with a quick charging connector 77 and a normal charging connector 78. The quick charging connector 77 and the normal charging connector 78 are arranged at upper and lower sides, respectively. The charging connector 75 is placed outward and rearward relative to the electric component cover 26 and inward relative to the upper cover 28 (see FIG. 1).

Figure 7:
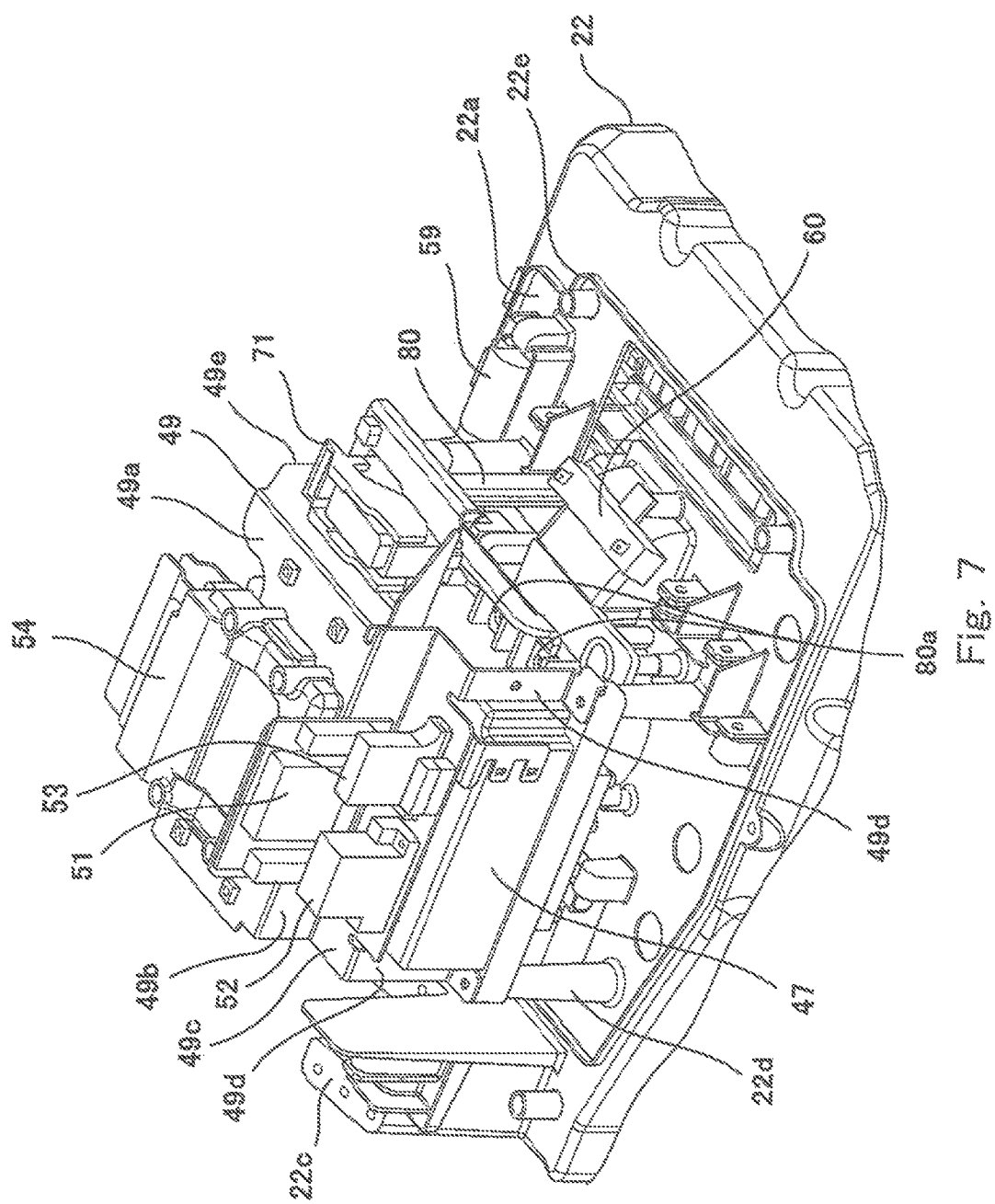
FIG. 7 is a perspective view of a region above a battery case of the electric motorcycle of FIG. 1, when viewed from the right and front.
Figure 8:
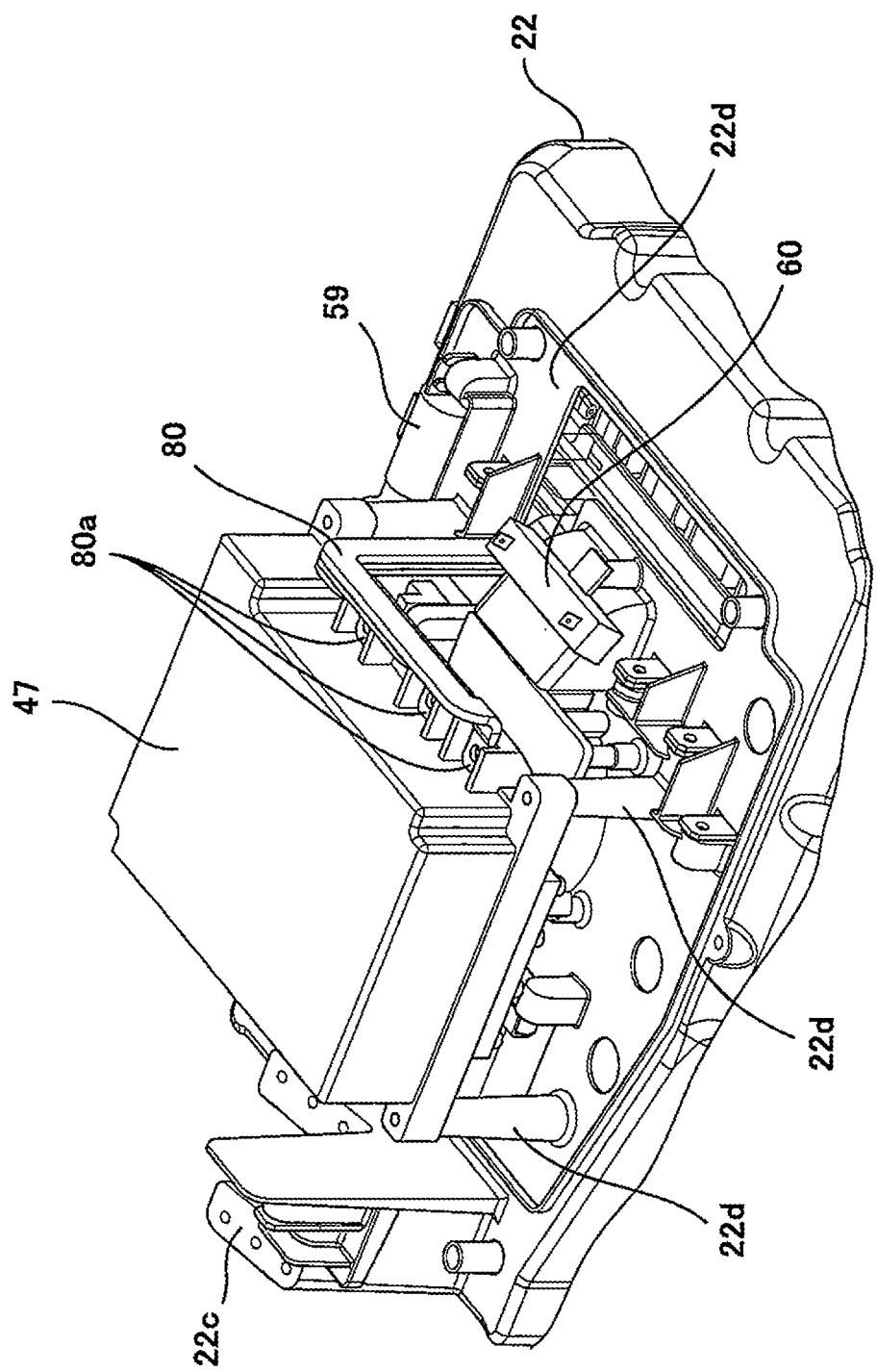
FIG. 8 is a perspective view showing a state in which an ECU, a DC/DC converter and the like in the region above the battery case of FIG. 7 are detached.
Figure 9:
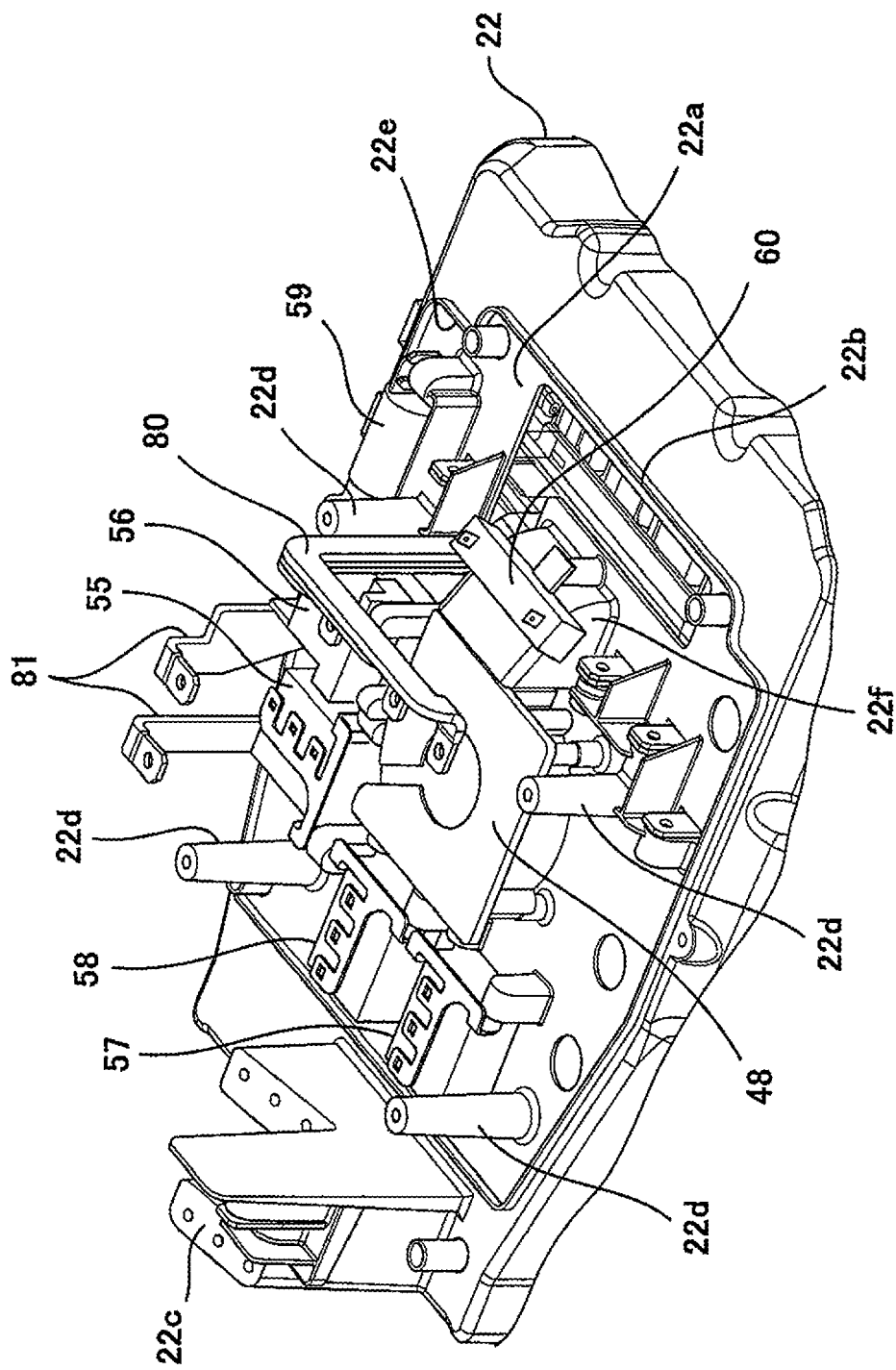
FIG. 9 is a perspective view showing a state in which an inverter and the like in the region above the battery case of FIG. 8 are further detached.

FIG. 7 is a perspective view of the region above the battery case 20 of the electric motorcycle 1 of FIG. 1, when viewed from the right and front. FIG. 8 is a perspective view showing a state in which the ECU 54, the DC/DC converter 50, and the like in the region above the battery case 20 of FIG. 7 are detached. FIG. 9 is a perspective view showing a state in which the inverter 47 and the like in the region above the battery case of FIG. 8 are further detached. As shown in FIGS. 6 and 9, the fan 48 is mounted to the center portion of the electric component region 22a provided in the upper surface of the upper case 22 of the battery case 20. The upper wall of the upper case 22 is formed with an air inlet 22g via which the electric component space S1 is in communication with the battery space S2. The fan 48 causes the air to flow from the interior of the electric component space S1 into the battery space S2 through the air inlet 22g. The upper case 22 is formed with a duct member 22f defining an air passage connecting the discharge outlet of the fan 48 to the air inlet 22g.

As shown in FIG. 9, in a region of the electric component region 22a, the pair of discharging relays 55, 56 are mounted on a current supply path connecting the batteries 40 to the inverter 47, and the pair of charging relays 57, 58 are mounted on a current supply path connecting the charging connector 75 to the batteries 40. In another region of the electric component region 22a, the fuse 59 provided in a power supply circuit and the pre-charge resistor 60 are mounted. From the electric component region 22a, a plurality of support elements 22d on which the inverter 47 is to be mounted protrude upward. The electric component region 22a is provided with a pair of bus bar modules 81 which are the electric wires protruding upward and electrically connected to the batteries 40 via the discharging relays 55, 56, the fuse 59, the pre-charge resistor 60, and the like. A bus bar module 80 protrudes upward from the battery space S2 through an opening 22b formed in the electric component region 22a. The bus bar module 80 includes three bus bars stacked together, insulatively bonded together and integrated, which are electric wires used to supply a three-phase AC current from the inverter 47 to the electric motor 42. Thus, the bus bar module 80 can be easily handled, and generation of noise can be suppressed.

As shown in FIG. 8, the inverter 47 is mounted on the support elements 22d. The inverter 47 is placed above the upper case 22 and forms a gap with the upper surface of the upper case 22. The inverter 47 is configured to convert DC power supplied from the batteries 40 (see FIG. 3) into AC power and supply the AC power to the electric motor 42 (see FIG. 3), and includes a semiconductor switching element. The inverter 47 is placed above the batteries 40 to overlap with the battery case 20 when viewed from above. The inverter 47 is placed above the battery case 20 to be included within the battery case 20 when viewed from above. The inverter 47 has a flat shape in which a vertical dimension is smaller than a dimension in the forward and rearward direction and a dimension in the rightward and leftward direction. The inverter 47 is placed inward relative to the front and rear edges and right and left edges of the assembly of the battery case 20 and the batteries 40 when viewed from above.

The inverter 47 is placed above the fan 48, the discharging relays 55, 56, and the charging relays 57, 58 to overlap with the fan 48, the discharging relays 55, 56, and the charging relays 57, 58 when viewed from above. In other words, the fan 48, the discharging relays 55, 56, and the charging relays 57, 58 are placed between the battery case 20 and the inverter 47. In this structure, many electric components can be placed in the electric component region 22a with a small area, and the electric wires or the like connecting them to each other, and the electric wires or the like connecting them to the batteries 40, can be reduced in length. Three terminal sections 80a of the bus bar module 80 are connected to the output terminal of the inverter 47. Although not shown, the terminal sections of the bus bar modules 81 (see FIG. 9) are connected to the input terminal of the inverter 47.

As shown in FIGS. 6 and 7, a shield member 49 formed by bending a metal plate is placed over the inverter 47. The shield member 49 includes first leg elements 49d placed on the inverter 47 to correspond to some of the support elements 22d, respectively, a first horizontal wall portion 49c extending horizontally from the upper ends of the first leg elements 49d, a vertical wall portion 49b extending upward from the end portion of the first horizontal wall portion 49c, a second horizontal wall portion 49a extending horizontally from the upper end of the vertical wall portion 49b, and second leg elements 49e extending from the end portion of the second horizontal wall portion 49a and placed on the inverter 47 to correspond to the other support elements 22d, respectively. Thus, the shield member 49 has a step shape.

On the upper surface of the first horizontal wall portion 49c, the ground leakage sensor 51, the DC/DC converter relay 52, and the varistor 53 are mounted. On the upper surface of the second horizontal wall portion 49a, the ECU 54 for controlling the inverter 47, the relays 52, 55 to 58, etc., is mounted. On the lower surface of the second horizontal wall portion 49a, the DC/DC converter 50 is mounted. In other words, the shield member 49 is interposed between the DC/DC converter 50 and the ECU 54 to isolate them from each other. In this structure, the shield member 49 shields electromagnetic noise generated from the DC/DC converter 50 and the inverter 47 and thereby prevents the noise from being transmitted to the ECU 54. In other words, since the electric components in the weak electric system (the ECU, the sensors, etc.) are placed above the electric components in the strong electric system (the inverter, the DC/DC converter, etc.) with the metal plate interposed between the electric components in the weak electric system and the electric components in the strong electric system, space saving can be achieved while preventing the effects of the electromagnetic noise on the electric components in the weak electric system.

Figure 10:
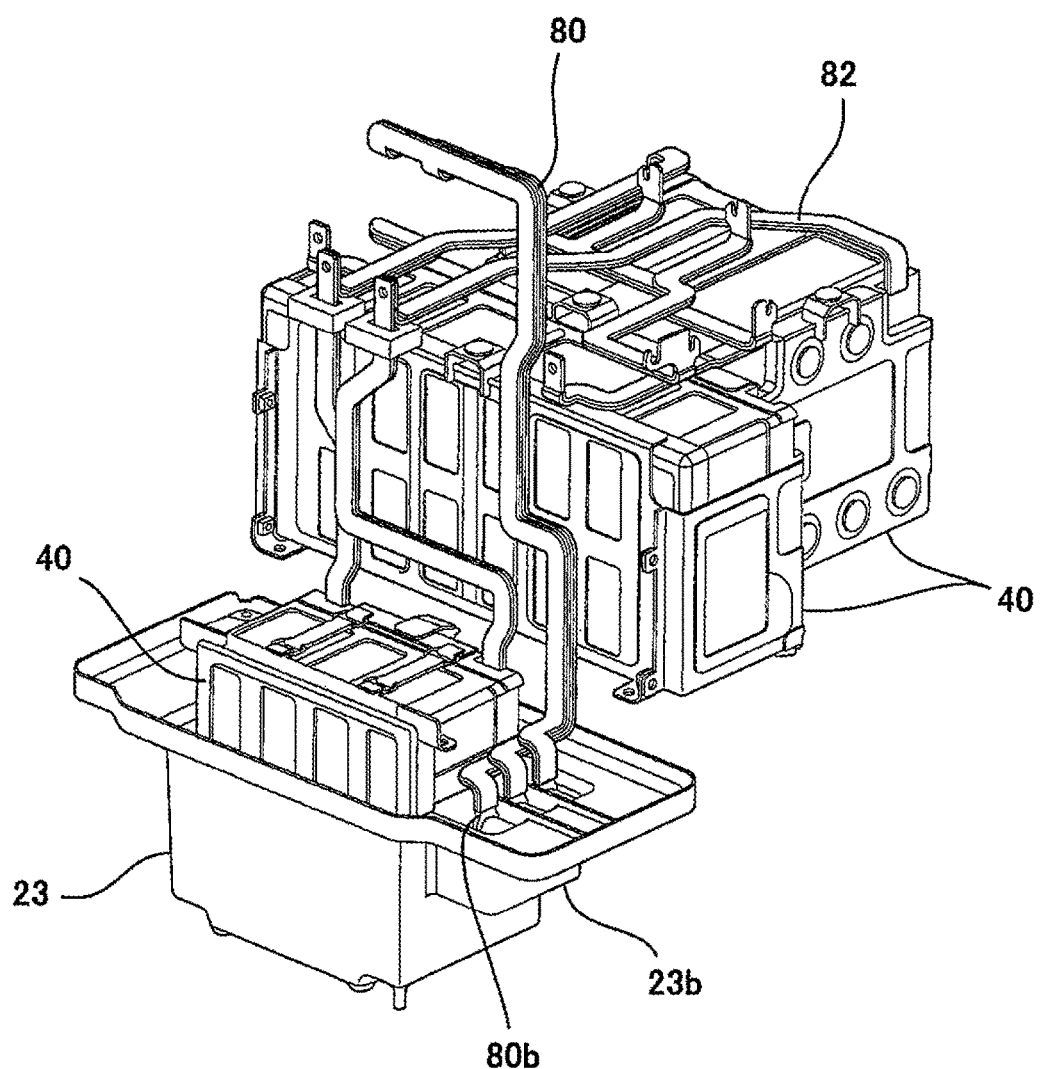
FIG. 10 is a perspective view of major components for explaining bus bar modules in the interior of the battery case of the electric motorcycle of FIG. 1.

FIG. 10 is a perspective view of major components for explaining the bus bar modules 80, 82 in the interior of the battery case 20 of the electric motorcycle 1 of FIG. 1. As shown in FIGS. 4 and 10, the bus bar module 80 as the electric wire connecting the electric motor 42 (see FIG. 1) to the inverter 47 vertically runs through the internal space of the battery case 20 (see FIG. 4). Terminal sections 80b at the lower end portion of the bus bar module 80 are placed in a terminal accommodating section 23b of the lower case 23. Between the terminal sections 80b in the terminal accommodating section 23b and the terminal section (not shown) of the electric motor 42, three high-voltage electric cables 27 (see FIG. 1) are placed to couple the terminal sections in a location outside of the battery case 20. In this case, since the lower case 23 including the terminal accommodating section 23b and the electric motor 42 are adjacent to each other in the forward and rearward direction, the high-voltage electric cables 27 exposed to outside can be reduced in length. As shown in FIG. 10, the batteries 40 are interconnected in series by the bus bar module 82. The positive terminal and negative terminal of the battery group connected in series are connected to the bus bar module 81 (see FIG. 9) provided in the electric component space to connect the battery group to the inverter 47.

Turning back to FIG. 3, in the interior of the casing of the inverter 47, cooling medium passages (not shown) through which the oil as the cooling medium flows are provided, and the lower portion of the inverter 47 is provided with a cooling medium inlet 62 and a cooling medium outlet 63 which are in communication with the cooling medium passages. Cooling medium pipes 64, 65 are connected to the cooling medium inlet 62 and the cooling medium outlet 63, respectively. The cooling medium pipes 64, 65 penetrate the upper wall of the upper case 22 and run through the internal space of the battery case 20. The cooling medium pipes 64, 65 are connected to cooling medium pipes 67, 68, respectively, via a joint 66. The cooling medium pipe 67 is connected to the oil cooler 69, while the cooling medium pipe 68 is connected to the casing 44 of the motor unit 25. The oil flows into the casing 44 through the cooling medium pipe 68, cools or lubricates the electric motor 42 or the transmission 43, and then is gathered in the oil pan 44a. The oil accumulated in the oil pan 44a is suctioned up by the oil pump 45, and then is discharged to the oil cooler 69. After flowing through the oil cooler 69, the oil is guided to the inverter 47 through the cooling medium pipes 67, 64. In this way, the cooling medium pipes 64, 65, 67, 68 are used to circulate the cooling medium to the motor unit 25 and to the inverter 47. Specifically, the cooling medium pipes 64, 65, 67, 68 vertically run through the internal space of the battery case 20 to circulate the cooling medium to cooling components (motor unit 25, oil pan 44a, oil pump 45, oil cooler 69, etc.) provided below battery case 20 and the inverter 47 provided above the battery case 20.

In accordance with the above-described configuration, since the inverter 47 is placed above the batteries 40 to overlap with the battery case 20, when viewed from above, the batteries 40 with a heavy weight are placed at a lower side to lower the center of gravity of the electric motorcycle 1, and it becomes less likely that water splashing from a road surface contacts the inverter 47. Therefore, the inverter 47 need not meet high water-proof requirements. In addition, since the inverter 47 can be placed in the vicinity of the batteries 40, the electric wire (bus bar module) connecting the inverter 47 to the batteries 40 can be reduced in length. As a result, it becomes possible to reduce cost by reducing the water-proof requirements of the inverter, while lowering the center of gravity of the electric motorcycle 1.

In the electric motorcycle 1 which is limited in the width of the vehicle body, the inverter 47 is placed above the batteries 40 to overlap with the battery case 20 when viewed from above, and the motor unit 25 is placed below the batteries 40 to overlap with the battery case 20 when viewed from above. Therefore, the width of the vehicle body can be reduced, and an occupation space in the forward and rearward direction can be reduced.

Since the batteries 40 and the inverter 47 are placed between the handle 6 and the seat 30, the center of gravity of the vehicle body is easily made closer to the center position of the vehicle body. Even when the inverter 47 and the batteries 40 are arranged at upper and lower sides, respectively, a driver can easily steer the electric motorcycle 1. Since the electric components (e.g., the discharging relays 55, 56, the fuse 59, the pre-charge resistor 60, etc.) provided on a conductive path between the inverter 47 and the batteries 40 are placed above the batteries 40, the batteries 40 and the inverter 47 can be made close to each other.

Since the inverter 47 and the electric motor 42 are arranged at upper and lower sides, respectively, with the batteries 40 interposed between the inverter 47 and the electric motor 42, and the bus bar module 80 electrically connecting the inverter 47 to the electric motor 42 vertically runs through the internal space of the battery case 20, the bus bar module 80 can be easily protected from an outside world and space efficiency can be increased. Since the inverter 47 and the electric motor 42 are arranged at upper and lower sides, respectively, with the batteries 40 interposed between the inverter 47 and the electric motor 42, and the cooling medium pipes 64, 65 used to circulate the cooling medium run through the internal space of the battery case 20, the cooling medium pipes 64, 65 can be easily protected from an outside world and space efficiency can be increased.

Since the inverter 47 and the motor unit 25 are placed close to each other in the forward and rearward direction, specifically, at upper and lower sides, respectively, with the battery case 20 interposed between the motor unit 25 and the inverter 47, the length of each of the cooling medium pipes 64, 65 in the forward and rearward direction can be reduced. Since the electric motor 42 is placed rearward relative to the lower case 23 (lower battery accommodating section) and below the middle case 21 (upper battery accommodating section), the center of gravity of the electric motorcycle 1 can be lowered. Even when the inverter 47 and the like are placed above the battery case 20, the vertical dimension of the electric motor 42, the batteries 40, the inverter 47, and the like, as a whole, is not increased, and therefore the driver's steering of the electric motorcycle 1 is not affected.

Since the electric component group 46 including the inverter 47 is placed forward relative to the rear end of the entire of the plurality of batteries 40, there is a sufficient space between the vehicle body and the abdominal part of the driver seated on the seat 30 and gripping the handle 6. Therefore, the driver can drive the electric motorcycle 1 with a comfortable posture. Since the charging connector 75 is placed rearward relative to and adjacently to the electric component group 46, and is smaller in dimension in the vertical direction and in the vehicle width direction than the whole electric component group 46 is, the charging connector 75 can be placed in a compact manner while keeping the driver from driving in a cramped posture. Since the charging connector 75 is placed in front of the seat 30, it becomes possible to prevent a situation in which the driver starts the electric motorcycle 1 in the state in which the power supply connector 90 is connected to the charging connector 75.

Heat generated in the inverter 47 travels upward. Since the inverter 47 is placed above and fastened to the battery case 20, it becomes possible to prevent heat generated in the inverter 47 from being transferred to the batteries 40. Because of the vertical gap formed between the inverter 47 and the battery case 20, heat transfer to the batteries 40 can be prevented more effectively. Since the inverter 47 is covered by the cover (shield member 49) made of metal, from outward, the emission of the electromagnetic noise to outside of the electric motorcycle 1 can be suppressed.

Since the middle case is made of metal, the electric wires and the cooling medium pipes can be protected more effectively. The cooling medium pipes are placed at an outward side in the vehicle width direction, which is an opposite side (in the present example, right side) of the side stand, with respect to the batteries. In this layout, even when the vehicle body falls to the left in a stopped state of the electric motorcycle 1, the cooling medium pipes do not contact an obstacle such as a road surface.

The terminal block of the inverter 47 and the terminal block of the electric motor 42 are placed inward relative to the front, rear, right, and left edges of the assembly of the batteries 40 and of the battery case 20, when viewed from above. Therefore, the electric wires can be placed inward relative to the contour of the battery case 20 to electrically connect the inverter 47 to the electric motor 42. Since the electric component group 46 is placed outside of the battery case 20, maintenance for the electric component group 46 can be carried out more easily without a need to open the battery case 20.

Since the electric component group 46 is placed above the batteries 40, assembling can be carried out more easily than in a case where the electric components are placed below the batteries 40. Since the electric component group 46 including the inverter 47 is placed on the upper case 22 detachably mounted to the middle case 21, of the battery case 20, assembling can be carried out in a state in which the electric component group 46 is mounted to the battery case 20 as a sub-assembly. When the battery case 20 is detached from the vehicle body, the electric component group 46 can be detached from the vehicle body together with the batteries 40. This allows an operator to easily check the operation of the batteries 40 in the state in which the batteries 40 are detached from the vehicle body before or after shipping.

The electric components including the inverter 47 may be placed in the interior of the battery case 20. The electric vehicle may be a three-wheeled vehicle or a four-wheeled vehicle, as well as the motorcycle. The electric wires and the cooling medium pipes may run through a region outside of the battery case 20. Or, either the electric wires or the cooling medium pipes may run through a region outside of the battery case 20. The cooling components placed below the battery case 20 may include, for example, at least one of a motor, a radiator (heat exchanger), a pump, an oil pan, a filter, etc. Or, other cooling components placed below the battery case 20 may include a component to be cooled, other than the motor. For example, the component to be cooled may include a functional component used for cooling the batteries, or a temperature sensor, a pressure sensor, etc. The cooling medium may be a liquid or a gas, and may be transformed into a gas or a liquid within the cooling medium pipes. The present invention is not limited to the above-described embodiment, and its configuration can be changed, added to, or deleted from within the scope of the invention.

INDUSTRIAL APPLICABILITY

As described above, the electric vehicle of the present invention can attain an advantage that it can reduce cost by reducing the water-proof requirements of the inverter, while lowering the center of gravity of the electric vehicle. Therefore, the electric vehicle of the present invention is widely applicable to a straddle-type vehicle, such as an electric motorcycle, etc., which can attain this advantage.

REFERENCE CHARACTER LIST

1 electric motorcycle (electric vehicle)
2 front wheel
3 rear wheel
6 handle
20 battery case
21 middle case (upper battery accommodating section)
22 upper case (upper battery accommodating section)
23 lower case (lower battery accommodating section)
30 seat
40 battery
42 electric motor
46 electric component group
47 inverter
65, 66 cooling medium pipe
80 bus bar module (electric wire)

The invention claimed is:

1. An electric vehicle comprising:
an electric motor which generates driving power for driving a wheel;
a battery case accommodating a battery storing DC power to be supplied to the electric motor, in a battery space in an interior of the battery case; and
an inverter which converts the DC power supplied from the battery into AC power and supplies the AC power to the electric motor,
wherein the inverter is placed above the battery to overlap with the battery case when viewed from above,
wherein the electric motor is provided at a lower side of the battery case, and
wherein an electric wire connecting the electric motor to the inverter vertically runs through an internal space of the battery case.

2. The electric vehicle according to claim 1, being a straddle-type vehicle.

3. The electric vehicle according to claim 1, further comprising
a handle; and
a seat,
wherein the battery and the inverter are placed between the handle and the seat.

4. The electric vehicle according to claim 1, further comprising:
an electric component provided on an electric wire connecting the inverter to the battery,
wherein the electric component is placed above the battery and fastened to the battery case.

5. The electric vehicle according to claim 1, further comprising:
a cooling medium pipe which circulates a cooling medium to the inverter,
wherein the cooling medium pipe runs through the internal space of the battery case.

6. The electric vehicle according to claim 5,
wherein the cooling medium pipe connects a cooling component to the inverter.

7. The electric vehicle according to claim 6,
wherein the cooling component and the inverter are placed such that the battery case is interposed between the cooling component and the inverter.

8. An electric vehicle comprising:
an electric motor which generates driving power for driving a wheel;
a battery case accommodating a battery storing DC power to be supplied to the electric motor, in a battery space in an interior of the battery case;
an inverter which converts the DC power supplied from the battery into AC power and supplies the AC power to the electric motor; and
a cooling medium pipe which circulates a cooling medium to the inverter,
wherein the inverter is placed above the battery to overlap with the battery case when viewed from above, wherein the cooling medium pipe runs through an internal space of the battery case, and wherein the cooling medium pipe vertically runs through the internal space of the battery case and circulates the cooling medium to a cooling component provided at a lower side of the battery case and to the inverter.

9. The electric vehicle according to claim 8, wherein the electric vehicle is a motorcycle, wherein the electric motor and the battery case are placed between a front wheel and a rear wheel, wherein the battery case includes an upper battery accommodating section and a lower battery accommodating section which is shorter in a forward and rearward direction than the upper battery accommodating section is, and wherein the electric motor is placed rearward relative to the lower battery accommodating section and below the upper battery accommodating section.

\* \* \* \* \*